United States Patent [19]
Matsumoto et al.

[11] Patent Number: 4,966,435
[45] Date of Patent: Oct. 30, 1990

[54] PLASTIC OPTICAL FIBER

[75] Inventors: Tsuruyoshi Matsumoto; Takashi Yamamoto; Teruhiko Sugimori; Katsuhiko Shimada, all of Ohtake, Japan

[73] Assignee: Mitsubishi Rayon Company, Ltd., Tokyo, Japan

[21] Appl. No.: 442,714

[22] Filed: Nov. 29, 1989

[30] Foreign Application Priority Data

Nov. 29, 1988 [JP] Japan ................................. 63-299671

[51] Int. Cl.$^5$ .................... G02B 6/00; C07D 317/00; C08F 16/24
[52] U.S. Cl. ............................. 350/96.34; 350/96.30; 549/455; 526/247
[58] Field of Search ........................ 350/96.30, 96.34; 549/455; 526/247

[56]      References Cited
       U.S. PATENT DOCUMENTS 4,431,786  2/1984  Squire .................................. 526/247
4,535,175  8/1985  Squire .................................. 549/455

Primary Examiner—Brian Healy
Attorney, Agent, or Firm—Oblon, Spivak, McClelland, Maier & Neustadt

[57] ABSTRACT

A plastic core-plastic cladding optical fiber is described wherein the core is composed of a copolymer of a perfluorodioxole represented by the following formula:

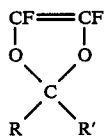

[I]

wherein R and R' independently represent F or CF$_3$, with at least one other ethylenically unsaturated monomer substantially free of CH bonds and the copolymer has no first order transition temperature as determined by the differential scanning colorimetry (DSC) and has a second order transition temperature not lower than 100° C. as determined by DSC.

3 Claims, No Drawings

PLASTIC OPTICAL FIBER

BACKGROUND OF THE INVENTION

1. Field of the Invention

The present invention relates to a plastic optical fiber having good light transmission characteristics, which can transmit not only visible rays but also rays having a wavelength in the infrared-to-near infrared region.

2. Description of the Related Art

A conventional plastic optical fiber having a core-sheath structure comprising polymethyl methacrylate, polystyrene or polycarbonate as the core component and a perfluoroalkyl methacrylate polymer as the sheath has a larger diameter, a better flexibility, a larger numerical aperture and a better connecting property to a light source than an optical fiber having a core composed of quartz or multi-component glass, and this plastic optical fiber is widely used as the light transmission medium in the fields of short-distance communication, data banks and light sensors.

When visible light of 400 to 600 nm is used, the attenuation of the core-sheath plastic optical fiber comprising polymethyl methacrylate, polystyrene or polycarbonate as the core component is 150 to 400 dB/km and thus is very satisfactory, but for light having a wavelength longer than about 650 nm, the attenuation is very large. The main wavelength of emission elements now manufactured on an industrial scale, that can be used as the light source in this field, is longer than 700 nm and in the infrared-to-near infrared region. The light transmission characteristics of the conventional plastic optical fibers are not satisfactory when these emission elements are used as the light source.

The polymer constituting the core of the plastic optical fiber, such as polymethyl methacrylate, polystyrene or polycarbonate, has many C-H bonds, and these C-H bonds have an absorption based on the stretching vibration or harmonic absorption at 650 to 660 nm, and this absorption is a cause of the extreme increase of the attenuation of radiation having a wavelength in the infrared-to-near infrared region.

Development of plastic optical fibers capable of transmitting radiation having a wavelength in the infrared-to-near infrared region has advanced and for example, Polymer Preprints, Japan, Vol. 31, No. 9, page 2357 discloses a core-sheath type plastic optical fiber comprising deuterated polymethyl methacrylate as the core, Japanese Unexamined Patent Publication No. 61-114210 discloses a core-sheath type plastic optical fiber comprising an a,b,b-trifluoro-pentafluorostyrene polymer as the core, and Japanese Unexamined Patent Publication No. 61-142211 discloses a core-sheath type plastic optical fiber comprising an a,b,b-trideuteropentafluorostyrene polymer as the core.

Since deuterated polymethyl methacrylate has no C-H bond, the initial attenuation of a core-sheath type plastic optical fiber comprising this polymer as the core is 20 dB/km at a wavelength of 650 to 680 nm and is very small, but if the optical fiber is allowed to stand for more than one month from manufacture, the attenuation is drastically increased and becomes 300 dB/km or more. This is because the water-absorbing property of deuterated polymethyl methacrylate is high, and the absorption of water increases in the plastic optical fiber with the lapse of time. An optical fiber showing such a large change with the passage of time is difficult to handle and cannot be used as an optical fiber having high reliability.

The attenuation of a plastic optical fiber comprising perfluoropolystyrene as the core at a wavelength of 660 nm is 115 to 140 dB/km, but it is reported that the attenuation of near infrared light having a wavelength of 850 nm is 400 dB/km, and the transmission characteristics for radiation having a wavelength in the near infrared region are not completely satisfactory. Furthermore, since the toughness of perfluoropolystyrene is lower than that of polymethyl methacrylate or polycarbonate, the plastic optical fiber comprising perfluoropolystyrene as the core has a problem in that the optical fiber is readily broken and the resistance to handling is not satisfactory.

Although development of a plastic optical fiber comprising a perfluoroalkyl methacrylate polymer as the core has advanced, since the glass transition temperature of this polymer is low and the shapeability to an optical fiber is poor, the preparation of an optical fiber having a uniform diameter is difficult and an optical fiber having good transmission characteristics cannot be obtained from this polymer.

SUMMARY OF THE INVENTION

The primary object of the present invention is to provide a plastic optical fiber having good transmission characteristics not only for light having a wavelength in the visible region but also for radiation having a wavelength in the infrared-to-near infrared region, and having a uniform diameter and an excellent heat resistance.

More specifically, in accordance with the present invention, there is provided a plastic optical fiber having a core-sheath structure, wherein the core component is composed of a copolymer of a perfluorodioxole represented by the following formula:

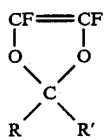

[I]

wherein R and R' independently represent F or $CF_3$, with at least one other ethylenically unsaturated monomer substantially free of CH bonds, and said copolymer has no first order transition temperature as determined by the differential scanning colorimetry (hereinafter referred to as "DSC") and a second order transition temperature not lower than 100° C as determined by DSC.

DESCRIPTION OF THE PREFERRED EMBODIMENT

Of heretofore developed plastic optical fibers comprising a fluorine-containing polymer as the core, a plastic optical fiber comprising fluorinated polystyrene as the core has problems in that the toughness of the optical fiber is too low and the emission characteristics for rays having a long wavelength exceeding 650 nm are not satisfactory. Furthermore, a plastic optical fiber comprising a fluorinated alkyl methacrylate polymer as the core has problems in that the glass transition temperature of the polymer is low, it is difficult to obtain an optical fiber having a uniform diameter, and since the refractive index of the fluorinated alkyl methacrylate polymer is low, it is difficult to search for a low-refractive-index polymer for a formation of the sheath of the optical fiber.

In contrast, the copolymers of the perfluorodioxole of formula [I] used in the present invention have a high glass transition temperature exceeding about 100° C and the shapeability into a fiber is excellent, and therefore, an optical fiber having a uniform diameter can be obtained from these copolymers.

Moreover, since these copolymers have no first order transition temperature as determined by DSC, the copolymers are substantially amorphous and have good light transmission characteristics.

Furthermore, the refractive index of the copolymer can be optionally controlled within a broad range of 1.29 to 1.4 by appropriately selecting another ethylenically unsaturated compound to be copolymerized with the perfluorodioxole, or by appropriately selecting the amount of the perfluorodioxole in the copolymer. By adequately selecting this copolymer and the sheath-constituting polymer, a core-sheath type optical fiber having excellent light transmission characteristics can be obtained.

Various compounds can be used as the other ethylenically unsaturated compound for the formation of the perfluorodioxole copolymer, but to avoid incorporation of a C—H bond, fluorine-containing monomers such as tetrafluoroethylene, chlorotrifluoroethylene and perfluoro(methyl vinyl ether) are preferably used.

A polymer having a first order transition temperature as determined by DSC contains a crystalline structure, and therefore, in the optical fiber prepared from this polymer, a scattering of light cannot be eliminated because of the presence of the crystal and good light transmission characteristics cannot be realized.

The glass transition temperature of the perfluorodioxole copolymer is not lower than about 100° C. If the glass transition temperature of the copolymer is lower than about 100° C, the shapeability into an optical fiber by melt forming is poor.

Preferably, the perfluorodioxole copolymer used in the present invention is prepared by redox polymerization using a persulfate/sulfite redox catalyst. A copolymer having a perfluorodioxole structural unit content of 10 to 90 mole% has good toughness and heat resistance and an optical fiber capable of efficiently transmitting light having a wavelength in the visible to-far infrared region can be prepared from this copolymer. Accordingly, this copolymer is especially preferable.

The perfluorodioxole copolymer obtained according to the above-mentioned procedure has much higher heat resistance than those of heretofore developed fluorine-containing amorphous copolymers, but the thermal stability at a high temperature is not completely satisfactory. It has been found that this is because minute amounts of multiple bonds and unstable end groups such as —COOH, —H, —COF and —SO$_3$H groups, which reduce thermal stability, are contained in the perfluorodioxole copolymer. The content of the unstable end groups should preferably be minimized. Of the unstable end groups, acid fluoride (—COF) and carboxyl (—COOH) groups occupy a substantial part of the unstable end groups in the perfluorodioxole copolymer, and therefore, by the term "content of unstable end groups" used in the present specification including the claims, we mean the total content of 13 COF and —COOH.

If a perfluorodioxole copolymer containing the unstable end groups in an amount of higher than 5 meq/kg is allowed to stand in the heated state, the copolymer is partially thermally decomposed and discolored. Therefore, the content of unstable end groups in the copolymer used in the present invention is preferably controlled so as to be below 5 meq/kg, especially below 2 meq/kg. The abbreviation "meq." used herein stands for "milliequivalent" or "milliequivalents".

The content of unstable end groups in the perfluorodioxole copolymer can be determined as follows.

The content of acid fluoride groups is measured by Fourier transform infrared spectroscopy (FTIR). Namely, polymer samples are prepared for measurement by compression molding a thin film between 51 and 255 micrometers thick at a temperature approximately 100° C above the polymer Tg. The molded film is mounted and placed in a Perkin-Elmer model 1750 or Nicolet Model 5DX FTIR and scanned for multiple scans between 4000 and 450 cm$^{-1}$ at a resolution of 2 cm$^{-1}$. The resulting spectrum is then plotted with expanded abscissa in absorbance mode. The band at 1929 cm$^{-1}$ is used as an internal thickness band. Absorbance for this band is measured using a baseline drawn between about 1980 cm$^{-1}$ and 1890 cm$^{-1}$. Acid fluoride is determined from the absorbance at 1881–1885 cm$^{-1}$, with the baseline for this band being drawn between about 1890 cm$^{-1}$ and 1858 cm$^{-1}$. The ratio of the absorbance at 1883 cm$^{-1}$ to the absorbance at 1929 cm$^{-1}$ is defined as the "acid fluoride index" (AFI):

$$AFI = A_{1883}/A_{1929}$$, where $A_{1883}$ = absorbance at 1883 cm$^{-1}$ and $A_{1929}$ = absorbance at 1929 cm$^{-1}$.

The acid fluoride band at 1883 cm$^{-1}$ is calibrated using perfluoro (2, 2-dimethyl-4-fluoroformyl-1, 3-dioxolane) as a model compound. Five solutions, having known concentrations in the range of 10–250 milliequivalents of acid fluoride per kilogram in perfluoro (1-butyltetrahydrofuran) are made up and absorbances determined with a Perkin-Elmer 1750 FTIR using the acid fluoride band at 1887 cm$^{-1}$. The thickness band at 1929 cm$^{-1}$ is calibrated by measuring the absorbance as a function of film thickness for polymer samples having thicknesses between 51 and 510 micrometers. It is found from these calibrations that $$C = 12.3 \times AFI$$

where C is the content of acid fluoride (—COF) groups in milliequivalents per kilogram of polymer and AFI is the acid fluoride index defined above.

A relative measure of carboxylic acid group content in the perfluorodioxozole copolymer is measured by FTIR. Namely, polymer samples for measurement are prepared and scanned by using an FTIR instrument in the same manner as mentioned with regard to the measurement of the acid fluoride group content The resulting spectrum is then plotted in absorbance mode The band at 1929 cm$^{-1}$ is used as an internal thickness band. Absorbance for this band is measured using a baseline drawn between about 1980 cm$^{-1}$ and 1890 cm$^{-1}$. Carboxylic acid is determined from the absorbance at 1808–1812 cm$^{-1}$, with the baseline for this band being drawn between about 1830 cm$^{-1}$ and 1800 cm$^{-1}$. The ratio of the absorbance at 1810 cm$^{-1}$ to the absorbance at 1929 cm$^{-1}$ is defined as the "carboxylic acid index" (CAI):

CAI=A1810/A1929, where A1810=absorbance at 1810 cm$^{-1}$ and A1929=absorbance at 1929 cm$^{-1}$. The content of carboxyl groups is calculated from the CAI.

The unstable end groups can be stabilized by reacting these groups with stabilizers such as amines and alcohols, and then reacting with fluorine. More specifically, the perfluorodioxole copolymer is reacted with a secondary or tertiary amine or a tertiary aliphatic alcohol, and the thus-modified and dried copolymer is reacted with fluorine gas at 20 to 200° C., especially at a temperature lower than the glass transition temperature of the copolymer, until the unstable end group concentration in the copolymer is reduced to the desired level. Fluorine gas comprising fluorine at a concentration of 10 to 25% by volume in an inert gas such as nitrogen is preferably used for this reaction.

The optical fiber of the present invention is prepared by using the above-mentioned perfluorodioxole copolymer as the core and a polymer having a refractive index smaller by at least 0.01 than the refractive index of the copolymer as the sheath-forming polymer. A perfluorodioxole/tetrafluoroethylene copolymer having no first order transition temperature as determined by DSC is preferably used as the sheath-forming polymer.

For the formation of the optical fiber, there can be adopted a core-sheath conjugate spinning (i.e., coextrusion) process or a process in which a core fiber is formed in advance and the core fiber is coated with a sheath-forming polymer.

The optical fiber of the present invention can transmit light in the near infrared wavelength region that cannot be transmitted by conventional plastic optical fibers, and since the core component thereof has a much higher heat resistance than conventional core materials, the field of application of the plastic optical fiber can be greatly expanded.

The plastic optical fiber of the present invention will now be described in detail with reference to the following examples.

EXAMPLE 1

A 2-liter horizontal polymerization kettle equipped with a paddle type agitator was charged with a solution of 2.0 g of ammonium sulfite in 1,100 g of demineralized water and the solution was heated to 60° C. The polymerization kettle was evacuated to 68 kPa, and to the evacuated polymerization kettle were added 50 ml of Freon 113 ® [registered trademark of E.I. du Pont de Nemours and Co. for fluorocarbon (CF$_2$Cl-CFCl$_2$)]and 8.0 g of a fluorine-containing surfactant consisting essentially of ammonium perfluorononanoate ("Surflon" S-111S supplied by Asahi Glass). With the agitator still off, 26.7 ml (42.7 g, 0.175 mole) of perfluoro(2,2-dimethyl-1,3-dioxole) (PDD) was pressured into the polymerization kettle to give a pressure of 90 kPa, and then, 13.5 g (0.116 mole) of chlorotrifluoroethylene (CTFE) was added to give a pressure of 207 kPa. The mole fraction of CTFE in the precharge was thus 0.40, based on the total monomers. After both monomers were added, agitation was begun at a rate of 200 rpm and a 1% solution of ammonium persulfate was added at a rate of 150 ml/hr. After 36 minutes of feeding of the initiator at this rate, the reactor pressure dropped to 179 kPa, a drop of 34.5 kPa, which indicated that polymerization had begun. At this point, the rate of addition of ammonium persulfate was reduced to 60 ml/hr. PDD monomer was now fed at a continuous rate of 51.7 ml/hr (82.7 g/hr, 0.34 mole/hr) and CTFE monomer was fed at a continuous rate of 26.7 g/hr (0.23 mole/hr) until 155 ml (248 g, 1.02 moles) of PDD and 80.1 g (0.68 mole) of CTFE had been added after the initial pressure drop. The mole fraction of CTFE in the continuously fed monomers was thus also 0.40. The addition of both monomers and the initiator was stopped at this time. After a further pressure drop of 21 kPa, the polymerization kettle was vented and the contents were recovered.

The cooled product had a weight of 1,732 g and a solids content of 19.8 % by weight. An additional 554 ml of deionized water was added to reduce the solids content to 15% by weight. The diluted latex was transferred to a 5-liter jacketed flask equipped with a mechanical paddle stirrer. The stirrer was turned at 350 rpm and 25 ml of concentrated HNO$_3$ (16 M) was added rapidly. The dispersion gradually thickened into a gel. Stirring was stopped and the mixture was allowed to stand for 15 minutes. After 15 minutes, stirring was resumed at 350 rpm and 86 ml of CFCl$_2$—CF$_2$Cl (Freon 113 fluorocarbon supplied by Du Pont) was poured into the flask at a rate of 50 ml/10 seconds. The gel immediately separated into copolymer and water phases. Stirring was continued for 15 minutes, and then the temperature was elevated at a rate of 2.5 degrees/minute to 45° C. by circulating hot water through the jacket of the flask. Nitrogen purge of the flask was begun in the flask to aid in removal of Freon 113. Stirring at 45° C. was continued for 1 hour to remove the bulk of the Freon, and then the temperature was elevated to 75° C. at a rate of 2.5° C./minute. A dip tube with filter cloth at the bottom was placed into the flask, and water was pumped out of the flask with a peristaltic pump at a rate of 45 ml/min. Fresh water was added to the flask at the same rate, to keep the volume approximately constant. This washing was continued for about 2 hours, or until the pH value of the effluent water was 7 as measured by indicator paper. At this point, further addition of water was stopped and all but about 50 ml of water was removed from the flask.

To the flask was added 25 ml of triethylamine, and the contents were stirred at 77° C. for 12 hours with a reflux condenser added to the flask to prevent loss of triethylamine. Then, the solid copolymer was recovered by vacuum filtration, washed twice with 100 ml portions of demineralized water and dried in a vacuum oven for 12 hours at 100° C. The yield of the thus-obtained light brown polymer was 230 g, and the glass transition temperature was 149° C., corresponding to a CTFE content of 35 mole%.

The powdered resin was placed into a fluorinator, which was evacuated, purged with nitrogen, heated to 95° C., evacuated again, pressured with nitrogen and evacuated again. Then, the pressure in the fluorinator was restored to atmospheric pressure with a 25% by volume mixture of fluorine in nitrogen. Additional gas mixture was passed over the polymer at a rate of 0.9 liter/minute at 100° C. for two hours, the temperature was then elevated to 105° C. and the flow of the gas mixture was continued for another one hour. The flow rate of the gas mixture was then lowered to 0.7 liter/minute and fluorination was continued for four more hours. The reactor heat was then turned off and the gas was switched to 100% nitrogen. After cooling, the reactor was opened and the treated polymer was recovered.

When the unstable end group content in the obtained perfluorodioxole was measured by FTIR, it was found that the unstable end group content was lower than 2 meq/kg. The polymer had a refractive index of 1.3286 at 25° C., sodium D line.

The obtained perfluorodioxole copolymer is supplied to a melt spinning apparatus and spun at a nozzle temperature of 270° C. to obtain a core fiber having an outer diameter of 980 μm. A copolymer comprising 78 mole% of perfluoro(2,2-dimethyl-1,3-dioxole) and 22 mole% of tetrafluoroethylene is dissolved in a fluorine-containing solvent (Fluorinate FC-75 supplied by 3M) at a solid concentration of 15% by weight to form a sheath-forming solution.

The obtained core fiber is immersed in the sheath-forming solution, drawn up from the solution and dried to obtain an optical fiber having an outer diameter of 1,000 μm.

The obtained optical fiber has light transmission of 270 dB/km at a wavelength of 650 nm, 330 dB/km at a wavelength of 780 nm and 285 dB/km at a wavelength of 1,550 nm, and it is confirmed that the product is an optical fiber capable of transmitting radiation in the visible-to-near infrared wavelength region efficiently.

EXAMPLE 2

A 2-liter horizontal polymerization kettle was charged with perfluoro(2,2-dimethyl-1,3-dioxole) (PDD) (20 ml, 32 g, 0.131 mole), perfluoro(methyl vinyl ether) (PMVE) (14 g, 0.084 mole), ammonium sulfite (1.25 g), a fluorine-containing surfactant (Surflon S-111S supplied by Asahi Glass) (4.0 g) and distilled water (1,150 ml) in an inert atmosphere. The reactor was sealed and heated to 65° C., and polymerization was started with 30 ml of an initiator solution (1% solution of ammonium persulfate in distilled water). The contents were stirred by using a paddle type agitator at 70 rpm.

After about 20 minutes, continuous feeding of PDD and PMVE was started at a rate of 30 ml/hr (PDD) and 20 g/hr (PMVE), respectively, and the initiator solution was fed at a rate of 30 ml/hr. This feeding of the two monomers and the initiator solution was continued for 4 hours. At the end of the run, the reactor was cooled and the contents were collected in a plastic container.

The polymer was coagulated with diluted nitric acid (about 6N, 50 ml) and then thoroughly washed with hot water at 70° C. in a blender. The polymer was then dried in a vacuum oven at 105° C. for 24 hours. The polymer had a glass transition temperature of 173° C as determined by DSC. The total weight of the polymer was 154 grams.

The powdered resin was placed into a fluorinator which was evacuated, purged with nitrogen, heated to 100° C. and evacuated again. Then the pressure in the fluorinator was restored to atmospheric pressure with a mixture of 20% by volume of fluorine and 80% by volume of nitrogen. This gaseous mixture was passed over the resin for 6 hours at a flow rate of about 0.6 l/min while maintaining the temperatuire at 100° C. The reactor heat was then turned off and the gas was switched to 100% nitrogen. After cooling, the reactor was opened and the treated polymer was recovered. The polymer had a refractive index of 1.30 at 25° C., sodium D line.

In the same manner as described in Example 1, a core fiber is prepared from the thus-obtained copolymer, and the core fiber is coated with a sheath forming solution like that used in Example 1 except that the polymer contains 89 mole % PDD and has a refractive index of 1.29. After the coating step the fiber is dried to obtain an optical fiber having an outer diameter of 1,000 μm The obtained optical fiber has light transmission of 305 dB/km at 650 nm, 375 dB/km at 780 nm and 320 dB/km at 1,550 nm, and it is confirmed that the obtained optical fiber can efficiently transmit radiation in the visible-to-near infrared wavelength region.

We claim:

1. A plastic optical fiber having a core-sheath structure, wherein the core component is composed of a copolymer of a perfluorodioxole represented by the following formula:

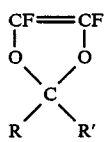

[I]

wherein R and R' independently represent F or $CF_3$, with at least one other ethylenically unsaturated monomer substantially free of CH bonds, and said copolymer has no first order transition temperature as determined by the differential scanning colorimetry (DSC) and has a second order transition temperature not lower than 100° C. as determined by DSC.

2. A plastic optical fiber as set forth in claim 1, wherein the unstable end group content, as determined by the Fourier transform infrared spectroscopy (FTIR), in the perfluorodioxole copolymer is below 5 meq/kg.

3. A plastic optical fiber as set forth in claim 1, wherein the other ethylenically unsaturated monomer is selected from the group consisting of tetrafluoroethylene, chlorotrifluoroethylene and perfluoro(methyl vinyl ether).

* * * * *